United States Patent [19]

Grubbs et al.

[11] 4,110,485
[45] Aug. 29, 1978

[54] HIGH-SHEEN ROAST AND GROUND COFFEE FLAKES OF IMPROVED EXTRACTABILITY

[75] Inventors: Dennis Robert Grubbs, Cincinnati; Timothy Andrew Lubsen, Springfield Township, Hamilton County; George Leroy Roseberry, Jr., Colerain Township, Hamilton County, all of Ohio

[73] Assignee: The Procter & Gamble Company, Cincinnati, Ohio

[21] Appl. No.: 683,583

[22] Filed: May 6, 1976

Related U.S. Application Data

[63] Continuation of Ser. No. 529,652, Dec. 4, 1974, abandoned.

[51] Int. Cl.² ............................................... A23F 1/00
[52] U.S. Cl. .................................... 426/595; 426/388; 426/465
[58] Field of Search ............... 426/594, 595, 473, 518, 426/457, 388, 465

[56] References Cited

U.S. PATENT DOCUMENTS

| | | | |
|---|---|---|---|
| 3,615,667 | 10/1971 | Joffe | 426/388 X |
| 3,625,704 | 12/1971 | Andre et al. | 426/594 X |
| 3,660,106 | 5/1972 | McSwiggin et al. | 426/595 X |
| 3,762,930 | 10/1973 | Mahlmann | 426/594 |
| 3,769,031 | 10/1973 | McSwiggin | 426/594 |

*Primary Examiner*—Frank Sever
*Attorney, Agent, or Firm*—Richard C. Witte; John A. O'Toole

[57] ABSTRACT

Roast and ground coffee in the form of high-sheen flakes and having improved extractability is disclosed. A process for preparing flaked roast and ground coffee of high sheen and improved extractability by passing roast and ground coffee through a roll mill operating at differential speeds and temperatures is also disclosed. The process comprises: passing roast and ground coffee through a roll mill wherein a first roll has a peripheral surface speed of 30 ft./min. to 850 ft./min. and a surface temperature of from 0° to 140° F and a second roll has a peripheral surface speed corresponding to from 2 to 8 times that of the first roll and a surface temperature of from 150° to 300° F; and removing from said roll mill roast and ground flakes of high sheen and extractability.

10 Claims, No Drawings

HIGH-SHEEN ROAST AND GROUND COFFEE FLAKES OF IMPROVED EXTRACTABILITY

This is a continuation of application Ser. No. 529,652, filed Dec. 4, 1974, now abandoned.

BACKGROUND OF THE INVENTON

This invention relates to roast and ground coffee and to a method for preparing same. More particularly, it relates to roast and ground coffee in the form of high-sheen flakes which exhibit improved extractability and to a process for preparing same.

Roast and ground coffee, i.e. coffee obtained by the grinding of roasted coffee beans, has for the most part existed in the conventional form known to all consumers. While considerable effort has been expended in the area of "instant" coffees to simulate the organoleptic and physical characteristics of roast and ground coffee, little relative effort has been directed to altering the fundamental physical characteristics of conventional roast and ground coffee. For example, U.S. Pat. Nos. 1,903,362 (issued Apr. 4, 1933 to McKinnis), 3,615,667 (issued Oct. 26, 1971 to Joffe), and 3,660,106 (issued May 2, 1972 to McSwiggin et al.) disclose coffee products in the form of flakes, while U.S. Pat. No. 3,713,842 (issued Jan. 30, 1973 to Lubsen et al.) describes panagglomerated roast and ground coffee of unique appearance. Similarly, U.S. Pat. No. 3,801,716 (issued Apr. 2, 1974 to Mahlmann et al.) describes a process of compressing and granulating roast coffee beans for the purpose of developing unique physical and/or organoleptic properties. While these patents illustrate prior art efforts to alter the conventional appearance of roast and ground coffee, the great bulk of the roast and ground coffee presently commercialized exists in its appearance aspects in relatively non-distinctive form. An especially distinctive and desirable appearance is, however, considered preferable by some consumers. Thus, it would be desirable to provide a roast and ground coffee product combining desirable organoleptic properties, improved extractability and an especially distinctive and pleasing physical appearance.

It is an object of the present invention to provide a roast and ground coffee product exhibiting desirable organoleptic and physical properties and a process for providing same.

Another object of the invention is the provision of a roast and ground coffee product in a particularly unique and pleasing physical form attractive to some consumers.

These and other objects of the invention and the method by which they are accomplished will become apparent from consideration of the more detailed description hereinafter.

SUMMARY OF THE INVENTION

It has now been discovered that desirable organoleptic and physical appearance properties in a roast and ground coffee product can be realized by providing the product in the form of high-sheen flakes prepared by roll millng under conditions of differential surface roll speeds and differential temperatures. In its product aspect, the present invention resides in high-sheen roast and ground coffee flakes characterized by a reflectance value of at least 35 units as determined by reflectance of a laser beam having a wave length of 6328 Å.

In its process aspect, the present invention provides a method for producing flaked roast and ground coffee of high sheen and improved extractability by (1) passing roast and ground coffee through a roll mill having a first roll operating at a peripheral surface speed of from 30 ft./min. to 850 ft./min. and at a surface temperature of from 0° to 140° F and a second roll operating at a peripheral surface speed of from 2 to 8 times that of the first roll and a surface temperature of from 150° to 300° F; and (2) removing from said roll mill, roast and ground flakes of high sheen and extractability.

DETAILED DESCRIPTION OF THE INVENTION

As used herein, the terms flaked roast and ground coffee and roast and ground coffee flakes are used interchangeably to refer to roast and ground coffee in the form of flakes.

The flaked roast and ground coffee of the present invention can be formed by subjecting conventional roast and ground coffee to the mechanical pressures of a roll mill operating under conditions of differential roll speed and temperature. The roast and ground coffee is passed through the roll mill which comprises a pair of parallel smooth or highly polished rolls and which crushes and flattens the coffee particles into flakes. The differential-speed and -temperature conditions of the mill cause the flakes to take on a high sheen or glistening appearance which is preferred by some consumers. The differential-speed and -temperature conditions also effect a disruption of the cellular structure and the coffee particles in such a manner as to provide a higher level of extractability than generally obtained from roast and ground coffee flakes. The provision of roast and ground coffee flakes of high sheen and improved extractability has been found to depend upon the control of certain processing parameters including the peripheral surface speeds of the rolls and the temperatures of the rolls. These and other processing variables are described in detail hereinafter.

The flaked roast and ground coffee of the present invention is provided in the form of high-sheen flakes of improved extractability largely as the result of the employment of differential roll speed which hereinafter refers to the employment of roll mill conditions whereby the rolls operate at different roll peripheral surface speeds, i.e., one roll is allowed to operate at a speed greater than that of the other roll. The peripheral surface speed of the rolls is measured in feet per minute of surface circumference which passes by the nip of the rolls. It has been discovered that a high sheen or glazed appearance can be provided on at least one surface of coffee flakes by operating a first roll within the range of from 30 to 850 ft./min. and a second or faster roll at a speed with respect to the slower roll corresponding to the ratio of from 2:1 to 8:1.

The employment of differential roll speeds permits individual coffee particles to be glazed or shined by a relatively faster moving smooth roll. The slower of the rolls allows the particles to be held momentarily onto the roll and sufficiently long for the faster roll to effect a glazing or smoothing operation on one side of each flake. The resulting high-shear effect enables the provision of flakes which exhibit a distinctive and high-sheen appearance and which are characterized by extensive cell disruption and high extractability.

The slower of the two rolls will normally be operated at a speed of from 30 to 850 ft./min. A roll speed slower than about 30 ft./min. tends to be impractical from the standpoint of desired product throughput. The flakes also tend to be thicker than those normally considered to be consumer acceptable. A roll speed greater than about 850 ft./min. tends to produce flakes which are thin and which contain more fines than might be considered acceptable. Moreover, high peripheral surface speeds promote frictional temperature increases which can alter and degrade the flavor of the roast and ground flakes. The employment of a peripheral roll speed for the slower roll of from 250 to 650 ft./min. permits the attainment of desirable throughput rates and enables the manufacture of high-sheen flakes having a thickness in a preferred range of from 0.008 to 0.025 inch. Thus, a preferred range of peripheral roll speed in the case of the slower roll is from 250 to 650 ft./min.

The peripheral roll speed of the second and relatively faster roll is an important parameter in the manufacture of high-sheen flakes of improved extractability. Normally, the faster roll will be operated at a speed with respect to the slower roll corresponding to the range of from 2:1 to 8:1. The faster roll effects the shining or glazing of individual compressed or flaked particles as they are momentarily held by the relatively slower roll. If the faster roll is operated so slow as to provide a speed differential of less than 2:1, the flaked particles do not take on the distinctive and desirable sheen which characterizes the product of the present invention. The shearing action provided by the requisite speed differential is lacking where this minimum differential is not maintained. Conversely, the speed of the faster roll should not exceed a rate corresponding to a differential of about 8:1. A differential peripheral roll speed of greater than 8:1 causes the flakes to be thinner and to contain excessive fines with the result that the flakes are readily broken with the formation of appreciable quantities of undesirable powder or fines. Excessive speed of the faster roll also tends to promote increases in the surface temperature of the rolls with the result that flavor degradation is obtained. As is described hereinafter, roll surface temperatures in excess of 300° F are undesirable from the standpoint of product flavor degradation and, accordingly, roll speeds tending to promote the attainment of such temperatures and adverse flavor effects are desirably avoided. Best results are obtained when the differential is from 3:1 to 5:1.

While peripheral surface roll speeds and speed differentials have been set forth in connection with operation of a roll mill to provide high-sheen flakes of improved extractability, it will be appreciated that optimal speeds will be determined in part by the size of the rolls employed and the physical and organoleptic properties desired in the flaked product.

The roll-mill surface temperature, measured in degrees Fahrenheit, refers to the average surface temperature of each roll of the roll mill. Control of the surface temperature of each roll has been found to be important to the provision of high-sheen roast and ground coffee flakes of improved extractability. Moreover, the temperature of each roll has been found to be closely tied to and correlated with the peripheral surface speeds of the respective rolls. For example, it has been discovered that the faster of the two rolls must also be operated at a surface temperature higher than that of the relatively slower roll.

In general, higher roll surface temperatures produce thinner flakes of roast and ground coffee which typically have high fines levels and increase the propensity for flavor degradation. On the other hand, lower roll surface temperatures produce relatively thicker flakes with little or no flavor degradation. High-sheen roast and ground flakes of high extractability and desirable thickness can be produced in an efficient manner and at high throughput by employing a roll surface temperature for the slower roll in the range of from 0° to 140° F. Temperatures less than 0° F are undesirable because expensive cooling systems must be employed and at such low temperatures the flake thickness tends to be greater than 0.025 inches; consequently, the flakes are thicker than those normally considered consumer acceptable. Additionally, at temperatures less than 0° F the resultant coffee flakes are very brittle and have a tendency to break during subsequent processing and packaging. This is undesirable because breaking of brittle flakes results in a change in product bulk density which may affect the consumer acceptability of the coffee flakes produced. Such weak flakes often have bulk densities not within the range of consumer acceptable flake bulk densities.

It is preferred that the surface temperature of the slower roll be within the range of from 50° to 100° F. When roll surface temperatures within this range are employed the majority of the resultant coffee flakes exhibit high sheen, have a thickness generally considered consumer acceptable, and combine high structural integrity and little or no flavor degradation.

The roll surface temperature of the faster roll has been found to have a material effect on the nature of the flakes produced by the process of the present invention. In order to obtain a desirable high-sheen effect, it has been found that the faster roll of the two rolls of the roll mill must also be operated at a higher surface temperature than the slower roll. Roast and ground coffee flakes of high sheen and extractability are produced when the surface temperature of the faster roll is in the range of from 150° to 300° F. If the temperature of the faster roll is such that the temperature is less than about 150° F, the flakes tend to have little plasticity and do not take on the desired and characteristic sheen. Moreover, a low yield of roast and ground coffee flakes is obtained as the flakes tend to be grabbed by the faster roll and torn into fragments. A roll surface temperature for the faster roll in excess of 300° F is also undesirable from the standpoint of flavor degradation or over-heating the product. Preferably, the faster roll is operated at a temperature of from 180° to 220° F which provides best results from the standpoint of sheen, yield and flavor results.

The surface temperature of each of the respective rolls can be controlled in known manner. This is accomplished by control of the temperature of a heat exchange fluid passing through the inner core of the rolls. Generally, the fluid, which is most often water, is heated or cooled and passed through the inside of the rolls. The result is that the roll surface which is usually a smooth, highly polished steel surface, is subjected to temperature control by means of heat transfer. Of course, in actual operation the surface temperature will not be exactly the same as the temperature of the heat exchange fluid and will be somewhat higher because milling of coffee particles to produce flakes tends to increase the roll surface temperature. This is especially true with respect to the faster roll which constantly slides or rubs over the surface of coffee flakes. Accordingly, determination of the temperature of the exchange fluid necessary to maintain any specific roll surface temperature will depend upon several factors such as the kind of metal the roll is made of, the roll wall thickness, the speed of operation of the roll mills, and the nature of the heat-exchange fluid employed.

Roll pressure will also influence the nature of the roast and ground coffee flakes obtained by the process of the present invention.

Roll pressure is measured in pounds per inch of nip. Nip is a term used in the art to define the length of surface contact between two rolls when the rolls are at rest. To illustrate, it can be thought of as a line extending the full length of two cylindrical rolls and defining the point or area of contact between two rolls.

To produce flaked roast and ground coffee of high sheen and extractability and in high yield, roll pressure should be within the range of from 1500 to 3500 lbs./inch of nip and preferably within the range of from 2000 to 3000 lbs./inch of nip. If pressures much less than 1500 lbs./inch of nip are employed, the resulting flakes do not take on a high-sheen appearance. Moreover, any flakes that are produced are much thicker than 0.025 inches and consequently the flakes are not normally considered consumer acceptable. On the other hand, if pressures in excess of 3500 lbs./inch of nip are employed the roast and ground coffee flakes tend to be thin and readily fractured because of the differential speed with the result that a low yield of large flakes and an appreciable amount of coffee fines is obtained. Additionally, at pressures in excess of 3500 lbs./inch of nip the roll friction produces excessive amounts of heat which as hereinbefore related also tends to produce thin flakes of impared flavor characteristics. Best results are obtained when the roll pressure is within the range of from 2000 to 3000 lbs./inch of nip.

The process of the present invention can be practiced with the aid of any of a variety of roll mills capable of subjecting roast and ground coffee to mechanical compressing action and adapted to the adjustment of pressure, roll speed and temperature. Suitable mills are those having two parallel rolls so that coffee particles passed between the rolls are crushed or flattened into flakes. Such mills will permit independent adjustment or variation of speed and temperature parameters such that a relatively faster and hotter roll can effect shining of individual flakes of roast and ground coffee. Normally, smooth or highly polished rolls will be employed as they permit ready cleaning; other rolls can, however, be employed if the desired flaking and high-sheen effects can be obtained.

The diameter of the roll mills, while it controls the angle of entry into the nip which in turn affects flake thickness and bulk density, is not critical per se. While rolls smaller than 6 inches in diameter can be employed to nip fine grind coffees, roll mills having a diameter of less than about 6 inches tend to hamper passage of the coffee through the mill by a churning effect which decreases throughput and efficiency. Best results will be obtained from mills having diameters in the range of from 6 to 30 inches. Examples of suitable mills which can be adapted in known manner to operation within the parameters defined hereinbefore include any of the well-known and commercially available roll mills such as those sold under the tradenames of Lehmann, Thropp, Ross, Farrell and Lauhoff.

The process of the present invention can be readily practiced by simply passing roast and ground coffee into a roll mill operating within the parameters hereinbefore defined and removing the high-sheen flakes which are dropped from the rolls. Normally, a chute or other feeding device will be employed to drop roast and ground coffee particles into the nip of the roll mill, as for example, by dropping the coffee particles from a hopper or by vibrating a falling cascade of particles into the nip.

The feed rate into the roll mill, of the roast and ground coffee to be flaked, is not critical. Either choke feeding or starve feeding can be employed as long as the previously discussed processing variables are operated within their prescribed ranges. Choke feeding is defined as having excess amounts of coffee settling on the roll mills waiting to pass through the nip. It is the opposite of starve feeding.

In further regard to the feeding rate, while either starve feeding or choke feeding can be employed, starve feeding is preferred because of particular process advantages offered by starve feeding such as greater economic efficiency, increased equipment life and increased process flexibility.

The process of the present invention has applicability to a variety of roast and ground coffee products including those which may be classified for convenience and simplification as low-grade, intermediate grade, and high-grade coffees. Suitable examples of low-grade coffees include the natural Robustas such as the Ivory Coast Robustas and Angola Robustas; and the Natural Arabicas such as the natural Perus and natural Ecuadors. Suitable intermediate-grade coffees include the natural Arabicas from Brazil such as Santos, Paranas and Minas; and natural Arabicas such as Ethiopians. Examples of high-grade coffees include the washed Arabicas such as Mexicans, Costa Ricans, Colombians, Kenyas and New Guineas. Other examples and blends thereof are known in the art and illustrated for example in U.S. Pat. No. 3,615,667 (issued Oct. 26, 1971 to Joffe).

The roast and ground coffee suitable for use in the preparation of the high-sheen flakes of the present invention include those conventionally prepared by known grinding means into "regular", "drip", or "fine" grinds as these terms are used in the art. The standards of these grinds are suggested in the 1948 Simplified Practice Recommendation by the U.S. Department of Commerce (see *Coffee Brewing Workshop Manual*, page 33, published by the Coffee Brewing Center of the Pan American Bureau). The particle size of the feed is not, however, critical and can be varied widely. The choice of grind will in part depend upon the particle size distribution and bulk density desired in the flaked product.

The roast and ground coffee suitable for manufacture into high-sheen flakes can be roasted to any of the roast colors generally recognized in the coffee arts. Thus, the light and dark roasts known in the art can be suitably employed. In actual practice, dark roasts are preferred inasmuch as the high-sheen effect is particularly evident against the darker background of a dark-roast product and the greatest impact or visual impression can be realized.

As previously stated, the flaked roast and ground coffee product prepared by the process of the present invention is distinctly different in appearance from the conventional roast and ground and flaked roast and ground coffee products described in the art. The distinctive physical appearance can be quantified by resort to reflectance measurement techniques and calibration against standardized reflecting surfaces.

A suitable technique for measuring the reflectance of the roast and ground coffee flakes produced by the process of the invention is based upon the principle that high-sheen surfaces reflect a greater proportion of incident light than relatively dull surfaces. Based upon measurement of the light reflected by the surfaces of flaked coffee particles and comparison with the light reflected by standard surfaces, a reflectance value for flaked coffee can be readily obtained.

In actual practice, the reflectance value of flaked coffee particles can be determined by measuring the light reflected by a single flake particle impinged with light from a standardized source. The following method and apparatus can be employed for this purpose. A random sample flake, of a size which permits handling, is placed on a movable platform or table within a light-tight enclosure. The table is adjustable for forward, backward and lateral movement by means of inner tracks and other controls. Suitable apparatus for this purpose is a conventional thin-film scanner unit equipped with movable scanner platform (American Instrument Company, Div. of Travenol Laboratories, Inc., Silver Spring, Maryland, Cat. No. 4-7410). The lid of the light-tight enclosure (thin-film scanner unit) is provided with a light port (hole) by means of which a light beam from an outside source is allowed to impinge at a 90° angle upon the sample placed on the platform inside the enclosure. The lid is provided with an outside mounting block having a superimposed light port and means for mounting a fiber optic sensing element. An inside mount, a plate having a 3-inch diameter hole and positioned on the inside of the lid such that the light passes through the center of the three-inch hole is provided for mounting of a photocell. The fiber optic sensor (Edmund Scientific, duPont Crofon $\frac{1}{8}$-inch light guide) is mounted in the outside mount behind the light port and inwardly toward the light beam at a 45° angle. The tip of the sensor element protrudes into the three-inch circle of the inner mount and picks up reflected light from the sample. A selenium photocell (B2M Photocell, International Rectifier Corp.) is mounted in the circle of the inner mount immediately adjacent the protruding fiber optic sensor element. The impulse from the photocell is passed to an amplifier and then to an electronic recorder.

A helium-neon gas laser unit (Spectraphysics Model 155, Spectra-Physics, Mountain View, California) is mounted vertically on the lid in an abutting relationship to the outside mount. The laser beam, 0.88 mm. diameter and 6328 Å wavelength, is directed at a 90° angle through and into the enclosure and is impinged upon the sample flake. The distance between the laser beam and the platform is 2 5/16 inches. The flake surface is scanned by manual adjustment of the platform to locate the point of highest reflectance as detected by the fiber-optic sensor. The electronic signal from the photocell is amplified and registered on a 0-to-100 scale of an electronic recorder (Honeywell Electronik 193, Honeywell Inc., Minneapolis, Minnesota). A zero reading is obtained when the laser unit is off, i.e. there is no reflected light.

The apparatus is calibrated by reference to standarized reflective surfaces. A standardized paint chip of dark blue color and hue (No. 15042, Federal Standard 595, 1961 Edition, available from National Bureau of Standards, Washington, D.C.) is utilized as a standard reflecting surface and the recorder is adjusted so as to provide a reading of two on the 0-to-100 recorder scale. Similarly, a standardized paint chip of beige color and hue (No. 11670, Federal Standard 595, 1961 Edition, available from National Bureau of Standards, Washington, D.C.) is utilized as a standard for calibration in the higher range of the scale, the recorder being adjusted so that a reading of 89 is obtained. The reflectance values for the two standard paint chips are measured alternately and the recorder is adjusted until readings of 2 and 89 are obtained. The test coffee flake is then impinged with the standardized light source described hereinbefore and a reading of reflectance value is recorded on the 0-to-100 scale.

Since coffee flakes do not provide a perfectly planar reflective surface and, thus, a degree of light scattering is observed, an average of three readings is taken to minimize reflectance variations from a single flake. An initial reading is recorded at a first flake orientation, referred to as the zero degree orientation. A second reading is taken at the position obtained by rotating the flake 120° clockwise from the first orientation (the 120° orientation) and a third reflectance reading is taken at the orientation obtained by rotating the flake 120° clockwise from the second orientation (referred to as the third orientation). At each orientation, the flake is manually scanned by the larger beam and the highest reflectance reading at that orientation is recorded. The average of the three readings represents the reflectance value of the coffee flake. The process of measuring the reflectance value of individual flakes is repeated a minimum of five or six times or as a means of minimizing any variations in flakes and to ascertain an average value which is taken as the reflectance value for the particular batch of coffee tested.

As used in the specification herein and in the appended claims, reflectance value, expressed as arbitrary reflectance units, represents the reflectance by coffee flakes of light from a 0.88 mm. helium/neon gas laser beam of 6328Å wavelength, calibrated against reflectance values of 2 and 89 units, respectively, for Federal Bureau of Standards Paint Chips 15042 and 11670.

The flaked roast and ground coffee of the present invention is characterized by a reflectance value of at least about 35 reflectance units. A roast and ground coffee product which is comprised of flakes which have a surface providing 35 reflectance units is readily appreciated as exhibiting a distinct, high-sheen or glistening effect. Below about 35 reflectance units, a high-sheen effect is not observed. As used herein, high-sheen flakes are characterized by a reflectance value of at least 35.

While reflectance values above about 60 are desirable from the standpoint of the visual effect and distinctiveness, such values tend to be difficult to attain. High-sheen flakes of reflectance value 40 to 60 can be conveniently and economically produced by the process described herein and combine readily recognizable sheen and are, thus, preferred herein.

The roast and ground coffee flakes of the invention can be packaged and utilized in the preparation of a brew or extract in known manner. When the flakes are produced by the milling process herein described, a content of fines will normally be present and depending upon the particular extraction method employed a greater or lesser amount of cup sediment may be observed. According to preferred practice, the high-sheen flakes will be employed in combination with conventional roast and ground coffee. Normally, flake-containing compositions will comprise from about 10 to about 80% by weight of the composition of the high-sheen flakes and from about 90 to about 20% conventional, i.e., non-flaked, roast and ground coffee. Thus, the content of high-sheen flakes can be varied depending upon the amount of sheen desirably provided in the product and upon the desired contribution of the flakes to cup solids and flavor. The balance of the composition, i.e., conventional roast and ground coffee, can be controlled, if desired, to diminish its contribution to cup solids in recognition of the enhanced extractability of the flakes of the invention.

A preferred composition combining a distinctive physical appearance with high extractability and desirable organoleptic properties comprises from about 25 to 60% of flakes exhibiting a reflectance value of from 40 to 60; and from about 40 to about 75% of conventional roast and ground coffee.

An important aspect of the process of the present invention is the provision of roast and ground coffee flakes of improved extractability. It has been discovered that the employment of differential roll-speed and temperature conditions during flake rolling provides an enhancement in extractability of the resulting flakes over that normally encountered in the flaking of roast and ground coffee. This enhancement is manifested by higher brew strength per weight of coffee employed in making a brew or infusion and is especially desirable where flaked decaffeinated product is desired. As is known in the art, the removal of caffeine from coffee products frequently is accomplished at the expense of the removal of certain other desirable components which contribute to flavor. The tendency of decaffeinated products to be either weak or deficient in flavor has, thus, been reported in the literature. The process of the present invention as applied to decaffeinated roast and ground coffee by enhancing extractability provides a compensatory advantage. The added flavor and strength advantages achievable by enhanced extractability permits realization of levels of flavor and brew strength which might otherwise not be attainable in the case of a conventional decaffeinated roast and ground product.

Other important advantages of the present invention are the provision of high-sheen flakes of high structural integrity and with little or no flavor degradation. The desirability of flakes of high structural integrity (i.e., physical strength and resistance to attrition or breakage during packing) is important because large percentages of broken flakes can change the produce bulk density and present unappealing appearance and cause cup sediment in the brew. Minimized coffee flavor degradation is, of course, important in respect to consumer preference for a coffee product.

The following examples are offered to further illustrate but not limit the invention disclosed herein.

EXAMPLE I

Seventy pounds of a blend comprising 30% high quality Arabicas, 30% Brazils, and 40% Robustas was roasted in four approximately equal portions in a Probat roaster to endpoint temperatures within the range of from 450° to 500° F. The four separately roasted portions were each quenched with 1.75 gallons of water and were characterized by roast colors of 80, 70, 60 and 50, respectively.

Each of the four portions hereinbefore described was ground slightly coarser than a regular grind size in a Gump pilot grinder. The roast and ground coffee moisture level was about 5.7%. Each portion was halved. One half was used for a control production of roast and ground flakes while the remaining half was utilized for the production of high-sheen roast and ground flakes in the following manner: The coffee was passed by starve feeding into a Ross two-roll mill, each roll being of 18-inch diameter and adapted to independent adjustment of peripheral roll speed and surface temperature. The feed rate was 2.6 pounds per inch of nip per minute while the roll pressure was adjusted to 2400 pounds per inch of nip. A first (slower) roll was operated at a peripheral surface speed of 355 feet per minute and at a roll surface temperature of 70° F while the second (faster) roll was operated at a peripheral surface speed of 1415 feet per minute (4:1 speed differential) and at a roll surface temperature of 180° F. Flaked coffee particles dropping from between the rolls exhibited a high-sheen appearance and were characterized by a thickness of 0.023 inch.

The second half of each roast portion referred to hereinbefore was made into flakes by a control process utilizing the roll mill described in Example I, except that each roll was adjusted to the same peripheral surface speed of 471 feet per minute and a roll surface temperature of 70° F. Starve feeding at a rate of 3.3 pounds per minute per inch of nip and a roll pressure of 3400 pounds per inch of nip were employed. The flaked coffee removed from the roll mill was characterized by a thickness of 0.023 inch.

Utilizing the reflectance measurement technique described hereinbefore, the flaked coffee products of Example I and of the control process were measured. Measurements were taken for each side of the resulting flakes; the side in contact with the faster roll of the differential roll-speed process of Example I and exhibiting sheen is denoted as Side 1. The following results were obtained (Table I).

Table I

| Roast Color (photovolts) | Reflectance Value From 6328Å Beam | | | |
|---|---|---|---|---|
| | Product of Example I | | Control Product | |
| | Side 1 | Side 2 | Side 1 | Side 2 |
| 80 | 48 | 34 | 20 | 17 |
| 70 | 41 | 19 | 15 | 10 |
| 60 | 45 | 22 | 18 | 19 |
| 50 | 44 | 21 | 24 | 22 |

As is apparent from inspection of the data of Table I, each product of Example I exhibited considerably higher reflectance values than the control product.

EXAMPLE II

Decaffeinated roast and ground coffee flakes were prepared in the manner of Example I, utilizing the same method and operating conditions, except that the four roast portions were obtained by roasting, under the same conditions, a decaffeinated coffee blend. The decaffeinated blend comprising 30% high quality Arabicas, 30% Brazils, and 40% Robustas. Each decaffeinated separately roasted portion was halved and utilized in the production of flakes by the differential-roll speed and -temperature process and the control process described in Example I. The results of reflectance measurements, made as described in Example I, are set forth in Table II as follows:

Table II

| Roast Color (photovolts) | Reflectance Value From 6328Å Beam | | | |
|---|---|---|---|---|
| | Product of Example I | | Control Product | |
| | Side 1 | Side 2 | Side 1 | Side 2 |
| 80 | 37 | 15 | 13 | 11 |
| 70 | 40 | 20 | 16 | 13 |

Table II-continued

| Roast Color (photovolts) | Reflectance Value From 6328A Beam | | | |
|---|---|---|---|---|
| | Product of Example I | | Control Product | |
| | Side 1 | Side 2 | Side 1 | Side 2 |
| 60 | 50 | 21 | 15 | 18 |
| 50 | 57 | 17 | 11 | 11 |

The flaked decaffeinated product of Example II exhibited visually a high sheen. Comparison of reflectance values for the product of Example II with those of the control product, as is apparent from Table II, illustrates the considerably higher reflectance of the flakes produced by the differential-roll speed and -temperature process of the invention.

EXAMPLE III

The extractability of flaked coffee of the invention was determined by the following extraction method. A slurry extraction was performed by adding 8.1 grams of coffee flakes to 200 ml. of boiling water, brewing for 3 minutes and straining the spent grounds from the brew which was cooled to room temperature and analyzed for solids content. In each case, the flaked coffee sample was the fraction through U.S. 12 mesh but on 16 U.S. mesh so as to avoid interference by high levels of rapidly extractable fines. The slurry extraction was performed on the regular and decaffeinated products of Examples I and II and on their respective controls with the results set forth in the following Table III.

TABLE III

| Roast Color (photovolts) Regular Blend | Brew Solids (Wt. %) | | % Increased Extraction |
|---|---|---|---|
| | Control | Product of Example I | |
| 80 | 0.60 | 0.72 | 20 |
| 70 | 0.60 | 0.68 | 13 |
| 60 | 0.70 | 0.81 | 13 |
| 50 | 0.68 | 0.87 | 28 |
| | | Avg. | 18.5% |
| Decaffeinated Blend | Control | Product of Example II | |
| 80 | 0.43 | 0.52 | 21 |
| 70 | 0.44 | 0.54 | 23 |
| 60 | 0.50 | 0.60 | 20 |
| 50 | 0.62 | 0.71 | 15 |
| | | Avg. | 19.8% |

As is apparent from inspection of the data of Table III, the regular and decaffeinated products of Examples I and II, prepared by a process of differential-roll speed and -temperature milling, exhibited higher extractability compared with the products of their respective controls. This was especially true for the decaffeinated products.

EXAMPLE IV

A blend of coffee composed by weight of 35% Arabica milds, 40% Brazilians and 25% Robustas is roasted to a roast color of 80. The resulting blend is halved, one half being ground in a Gump pilot grinder to a regular grind and one half being ground to a coarse grind. The Coarse ground coffee is dropped from a vibrating chute between the rolls of a Ross two-roll mill at a starve rate feed of 2.8 pounds per inch of nip per minute. The roll mill, adjusted to a roll pressure of 2400 pounds per inch of nip and equipped with a pair of 18-inch rolls is operated such that a first roll has a peripheral surface speed of 400 feet per minute and a surface temperature of 70° F and the second roll has a peripheral surface speed of 1600 feet per minute (4:1 ratio) and a surface temperature of 190° F. Roast and ground coffee flakes of high sheen and extractability are removed from the mill. A coffee product is prepared by mixing 50 parts by weight of the regular grind referred to above with 50 parts of the high-sheen flakes. The resulting product has a distinctive sheen and when brewed in conventional manner provides a pleasing and flavorful brew.

EXAMPLE V

A blend of green coffee composed by weight of 33% Arabica milds, 33% Brazilians and 33% Robustas is decaffeinated by conventional solvent decaffeination and roasted to a 60 roast color. The decaffeinated roast and ground blend is halved and one half is ground to a regular grind on a Gump pilot grinder while the second half is coarse ground. The coarse ground portion is starve fed at a rate of 3 pounds per inch of nip per minute by dropping a cascade of the particles from a feed hopper into the rolls of a Ross two-roll mill. The mill, comprising two 18-inch rolls and adjusted to provide a pressure of 2400 pounds per inch of nip, is operated such that a first roll has a peripheral surface speed of 300 feet per minute and a surface temperature of 65° F and a second roll has a peripheral surface speed of 1500 feet per minute (5:1 ratio) and a surface temperature of 190° F. A decaffeinated coffee product is prepared by admixing 40 parts by weight of the high-sheen flakes removed from the roll mill and 60 parts of the regular grind. The product exhibits an attractive physical appearance and brewed in a conventional manner provides a flavorful decaffeinated brew which compares favorably with non-decaffeinated brews.

What is claimed is:

1. A roast and ground coffee composition comprising from 10 to 80% by weight of the composition of roast and ground coffee in the form of flakes of high sheen and extractability, said roasted and ground flaked having a flake thickness of between 0.008 and 0.025 in. and having a reflectance value of at least 35 reflectance units, said reflectance units representing reflectance by coffee flakes of light from 0.88 helium/neon gas laser beam of 6328 Angstrom wavelength, calibrated against reflectance values of 2 and 89 units, respectively, for the Federal Bureau of Standards Paint Chips 15042 and 11670; and from 20 to 90% of non-flaked roast and ground coffee.

2. Roast and ground coffee according to claim 1 wherein the roast and ground coffee flakes comprise from 25 to 60% by weight and the non-flaked roast and ground coffee comprises from 40 to 75%.

3. Roast and ground coffee according to claim 2 wherein the roast and ground coffee flakes are characterized by a reflectance value of from 40 to 60 reflectance units.

4. A process for preparing roast and ground coffee flakes of high sheen and extractability which comprises: passing roast and ground coffee through a roll mill having a first roll operating at a peripheral surface speed of from 30 to 850 feet per minute and at a surface temperature of from 0° to 140° F and having a second roll operating at a peripheral surface speed of from 2 to 8 times that of the first roll and a surface temperature of from 150° to 300° F; and removing from said roll mill said roast and ground coffee flakes.

5. The process of claim 4 wherein said second roll has a peripheral surface speed of from 3 to 5 times that of said first roll.

6. The process of claim 4 wherein said first roll has a peripheral surface speed of from 250 to 650 feet per minute and a surface temperature of from 50° to 100° F.

7. The process of claim 6 wherein said second roll has a peripheral surface speed of from 3 to 5 times that of said first roll and a surface temperature of from 180° to 220° F.

8. The process of claim 4 wherein said second roll has a peripheral surface speed of from 3 to 5 times that of said first roll and a surface temperature of from 180° to 220° F.

9. The process of claim 4 wherein the roll mill has a roll pressure of from 1500 to 3500 pounds per inch of nip.

10. The process of claim 9 wherein the roll pressure is from 2000 to 3000 pounds per inch of nip.

* * * * *

UNITED STATES PATENT AND TRADEMARK OFFICE
CERTIFICATE OF CORRECTION

PATENT NO. : 4,110,485
DATED : August 29, 1978
INVENTOR(S) : Dennis R. Grubbs et al.

It is certified that error appears in the above-identified patent and that said Letters Patent are hereby corrected as shown below:

Col. 9, line 44, "produce" should read -- product -- .

Col. 10, line 53, "comprising" should read -- comprised -- .

Col. 12, line 44 (Claim 1, line 8), "0.88" should read -- 0.88 mm -- .

*Signed and Sealed this*

*Sixth Day of March 1979*

[SEAL]

*Attest:*

RUTH C. MASON
*Attesting Officer*

DONALD W. BANNER
*Commissioner of Patents and Trademarks*